United States Patent [19]
Kayser

[11] Patent Number: 5,790,390
[45] Date of Patent: Aug. 4, 1998

[54] POWER SUPPLY WITH REDUCED EMI

[75] Inventor: Kenneth W. Kayser, St. Charles, Ill.

[73] Assignee: Kayser Ventures, Ltd., Roanoke, Va.

[21] Appl. No.: 847,788

[22] Filed: Apr. 28, 1997

Related U.S. Application Data

[63] Continuation of Ser. No. 286,635, Aug. 5, 1994, abandoned.

[51] Int. Cl.$^6$ .................................................. H02M 3/335
[52] U.S. Cl. ........................................................ 363/20
[58] Field of Search ................................. 363/15, 16, 20, 363/21, 95, 97, 123, 131

[56] References Cited

U.S. PATENT DOCUMENTS

| | | | |
|---|---|---|---|
| 4,956,760 | 9/1990 | Gulczynski | 363/16 |
| 5,155,430 | 10/1992 | Gulczynski | 363/16 |
| 5,331,534 | 7/1994 | Suzuki et al. | 363/20 |

*Primary Examiner*—Matthew V. Nguyen
*Attorney, Agent, or Firm*—Arnold, White & Durkee

[57] ABSTRACT

A power supply system includes an a-c. power source and an off-line power supply for storing energy from the a-c. power source during first selected time intervals and converting at least a portion of the stored energy to a d-c. output during second selected time intervals. A diode or other switch disconnects the off-line power supply from the a-c. power source during the second selected time intervals to reduce conducted EMI. The first and second selected time intervals are preferably synchronized to the frequency of the a-c. power source.

29 Claims, 3 Drawing Sheets

POWER SUPPLY WITH REDUCED EMI

This application is a file wrapper continuation of application Ser. No. 08,286,635 filed Aug. 5, 1994 now abandoned.

FIELD OF THE INVENTION

The present invention relates generally to power supply systems and, more particularly, to off-line power supplies for supplying a d-c. output from an a-c. power source. A particularly useful application for the present invention is in bias supplies and other cost-sensitive applications such as appliances using microprocessors.

SUMMARY OF THE INVENTION

It is a primary object of the present invention to provide an improved off-line power supply which virtually eliminates conducted EMI.

Another important object of this invention is to provide an improved off-line isolated power supply which is extremely simple and inexpensive.

Still another object of this invention is to provide an improved off-line power supply which can accommodate a wide range of input voltages from the a-c. power source.

It is yet another object of this invention to provide an improved off-line power supply which is extremely reliable in operation, and can be made with a rugged construction.

Other objects and advantages of the invention will be apparent from the following detailed description and the accompanying drawings.

In accordance with the present invention, the foregoing objectives are realized by providing a power supply system comprising an a-c. power source; an off-line power supply for storing energy from the a-c. power source during first selected time intervals and converting at least a portion of the stored energy to a d-c. output during second selected time intervals; and means for disconnecting the off-line power supply from the a-c. power source during the second selected time intervals to reduce conducted EMI. In the preferred embodiment of the invention, at least the first selected time intervals are synchronized with the a-c. power source, and the second selected time intervals may also be synchronized with the a-c. signal.

The off-line power supply of this invention preferably converts a substantially constant amount of the stored energy to the d-c. output in each of the second selected time intervals, so that the d-c. output is maintained at a substantially constant power level.

DETAILED DESCRIPTION OF PREFERRED EMBODIMENTS

Figure 1:
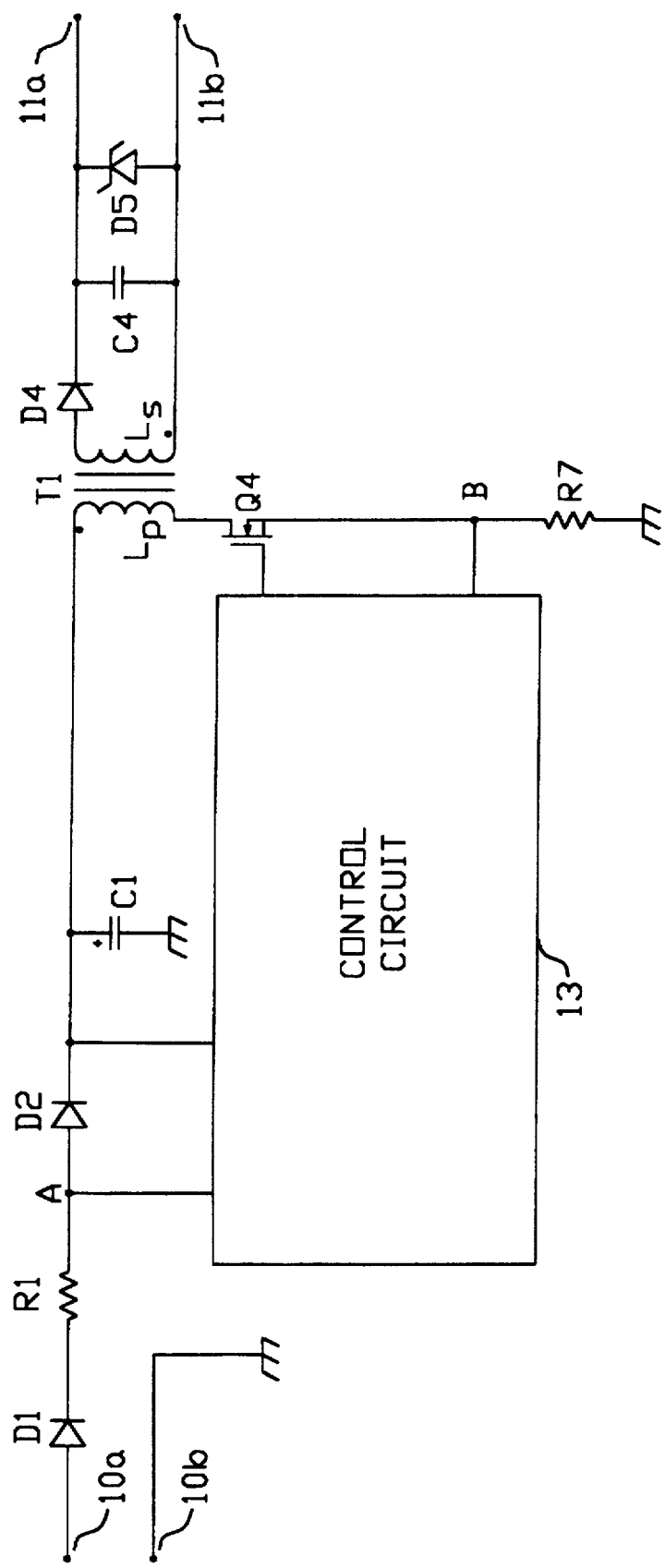
FIG. 1 is a schematic diagram of a bias-supply system embodying the invention.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents and alternatives falling within the scope of the invention defined by the appended claims.

Turning now to the drawings, FIG. 1 illustrates a bias supply system for receiving a-c. power from an external source connected to a pair of input terminals 10a and 10b and supplying a regulated d-c. output at a pair of output terminals 11a and 11b. The a-c. signal from one input terminal is applied to the anode of a diode D1 which functions as a half-wave rectifier to pass only the positive half cycles of the a-c. input. The cathode of the diode D1 is connected to a resistor R1 which functions as a current-limiting resistor to limit the in-rush of energy from the input terminals when the diode D1 is conducting.

From the resistor R1, the rectified power input is passed through a second diode D2 to a storage capacitor C1 to store the incoming energy. The capacitor C1 is charged during each positive half cycle of the a-c. input, and is periodically discharged during the time intervals while D2 is not conducting. This effectively disconnects the supply from the a-c. input line during the power transfer to the output. When the capacitor C1 discharges, the stored energy flows through the primary winding $L_p$ of a transformer T1 connected in series with a FET Q4. The FET is controlled by a control circuit 13 which controls the transfer of power to the d-c. output by turning the FET on and off.

The diode D2 functions as a disconnect switch to disconnect the off-line power supply from the a-c. power source while the C1 energy is being transferred to the output, which is when most of the conductive EMI is generated. Consequently, most of the conductive EMI generated by the off-line power supply is confined to the power supply itself, and cannot interfere with other circuits or devices. As will be apparent from the following description, most of the switching and inductive changes that produce EMI in the off-line power supply occur during the power transfer while the diode is in its disconnect mode. If desired, an active switching device may be used in place of the diode D2, which functions as a passive switch.

Whenever the FET Q4 is turned on, current flows through the primary winding of the transformer T1 which stores energy as an inductor of inductance $L_p$. This current ramps up to a peak value, $I_{PK}$, which flows through a connected between the FET Q4 and common. $I_{PK}$ produces a voltage across the resistor R7 which causes the control circuit 13 to turn off the FET Q4. With the FET Q4 off, the magnetic field built up in the primary winding of the transformer T1 collapses, and the energy present in the field is transferred to the secondary winding $L_S$ of the transformer T1. This produces an output current which flows through a diode D4 to the output terminal 11a and returning through terminal 11b. A capacitor C4 connected across the output terminals smoothes the output, and a zener diode D5 in parallel with the capacitor C4 regulates the output voltage. The diode D4 prevents conduction in the secondary winding of the transformer T1 while the capacitor C1 is discharging through the primary winding.

The illustrative bias-supply system provides a constant power output. The control circuit 13 turns off the FET Q4 when the voltage across the resistor R7 builds up to a preselected level representing a maximum current value $I_{PK}$ that is slightly below the level where the core of the transformer T1 starts saturating. That is, the value of $I_{PK}$ determines the power $E_{out}$ stored in the primary winding $L_p$, as can be seen from the following formula:

$$E_{out}=(L_P I_{PK})^2/2$$

where $L_P$ is the inductance of the primary winding of the transformer and $I_{PK}$ is the maximum current through the resistor R7.

Figure 2:
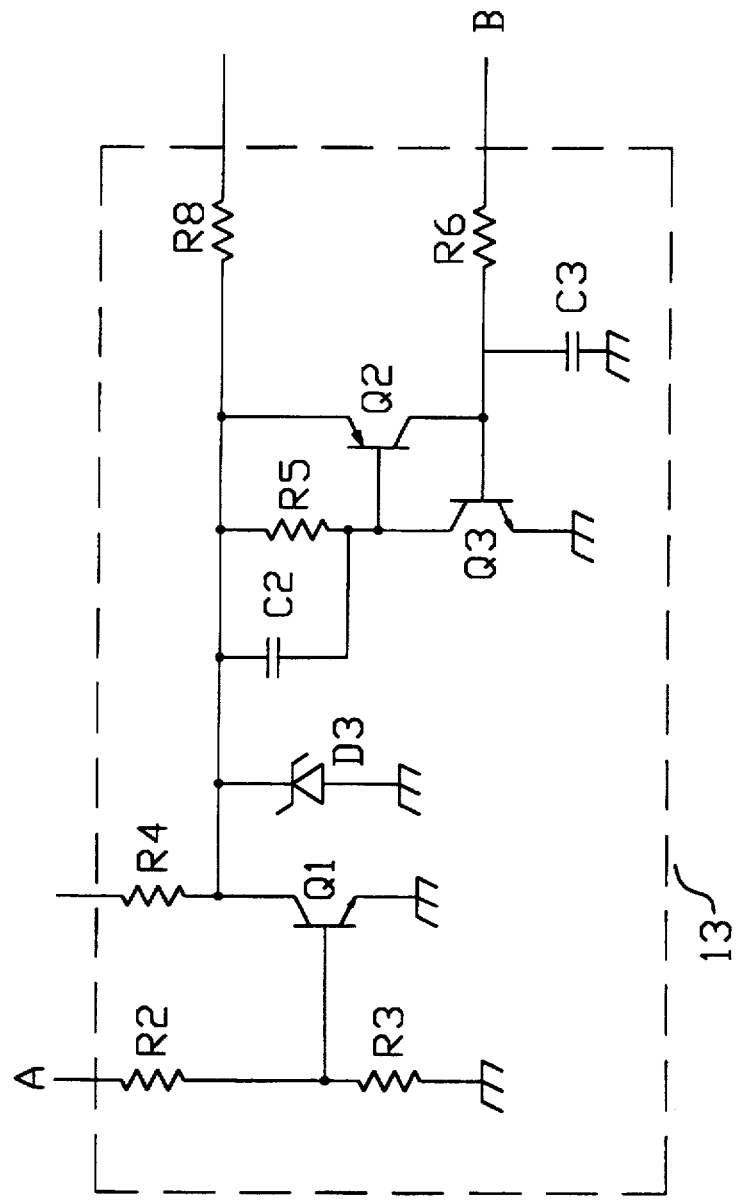
FIG. 2 is a schematic diagram of the control circuit included in the bias-supply system of FIG. 1.

FIG. 2 illustrates a preferred control circuit 13 for controlling the FET Q4 to transfer energy from the capacitor C1 to the transformer T during a single time interval in each negative half cycle of the a-c. input. In this circuit a pair of resistors R2 and R3 form a voltage divider which determines when the transistor Q1 is turned on, which occurs when the voltage at the base of the transistor Q1 reaches a selected threshold voltage $V_{T1}$. When the transistor Q1 is on, the FET Q4 and the transistors Q2 and Q3 are held off while the capacitor C1 is charging, during positive half cycles of the a-c. input. When the voltage at the base of the transistor Q1 falls below the threshold voltage $V_{T1}$, Q1 turns off, which enables the FET Q4 to be turned on. Resistors R4 and R8 complete a circuit coupled to the gate of the FET Q4 from the positive side of the capacitor C1. This circuit provides the necessary voltage to the gate to turn on the FET Q4.

When the FET Q4 is on, current from the capacitor C1 ramps through the FET Q4 so as to convey energy to the primary winding of the transformer T1. The current ramp causes the transistor Q3 to turn on when the voltage across R7 builds up to the base-emitter voltage of Q3. When the transistor Q3 turns on, it turns on the transistor Q2. The transistors Q2 and Q3 form a latch which turns off the FET Q4 by pulling down the voltage at the gate connection of the FET Q4. This latch holds the FET Q4 off until the transistor Q1 is turned on again by an increase in the input voltage due to the next positive half cycle of the a-c. input. Turning Q1 on removes the supply current to the transistors Q2 and Q3, thereby turning off the latch. Resistors R5 and R6 determine the current level at which the latch is turned off. When the FET Q4 turns off, the magnetic field built up in the primary winding of the transformer T1 collapses, and the energy in the primary winding transfers to the secondary winding.

A zener diode D3 has its cathode connected to the gate of the FET Q4 through R8 to prevent the voltage at the gate of Q4 from reaching a level which could damage Q4 or cause improper operation. Capacitors C2 and C3 are provided to reduce false triggering in the control circuit.

Figure 3:
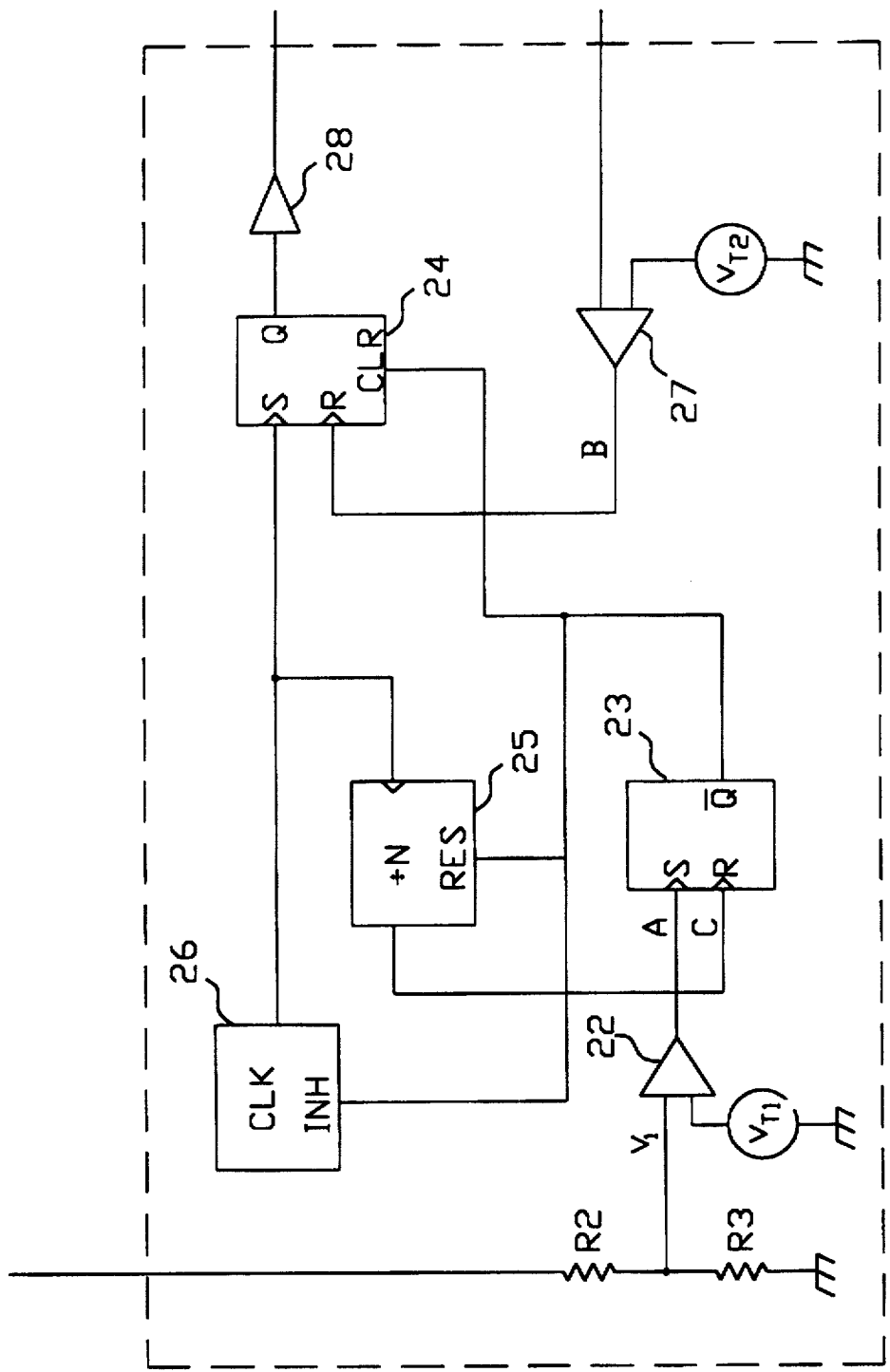
FIG. 3 is a schematic diagram of an alternative control circuit for use in the bias-supply system of FIG. 1.

FIG. 3 illustrates a modified control circuit 13 for discharging the capacitor C1 in multiple time increments within each negative half cycle of the a-c. input, rather than in a single increment as in the circuit of FIG. 2. Discharging the capacitor C1 in multiple time increments permits the discharge intervals to be shorter, with less energy per pulse, which in turn permits the use of a smaller transformer. This can be a significant advantage in applications having relatively large power requirements, which can cause the required transformer to become large in size.

In the circuit of FIG. 3, the voltage divider formed by the resistors R2 and R3 provides the voltage $V_1$ as one input to a voltage comparator 22. The other input to the comparator 22 is a predetermined reference voltage $V_{T1}$, which sets the threshold level for turning on the FET Q4. When the voltage $V_1$ reaches the threshold voltage $VT_{T1}$, the output of the comparator 22 goes high and sets an S-R flip-flop 23. The setting of the S-R flip-flop begins the time period during which the capacitor C1 is discharged in multiple time increments to transfer stored energy to the primary winding $L_P$ of the transformer T1.

The inverted output of the S-R flip-flop 23 is connected to the clear input of a second S-R flip-flop 24, the reset input of a divide-by-n counter 25, and the inhibit input of a clock 26. When the S-R flip-flop 23 is set, the inverted output is low and this clears the S-R flip-flop 24, resets the divide-by-n counter 25, and allows the clock 26 to run.

Each time the output of the clock 26 goes high, it sets the S-R flip-flop 24. Then the Q output of the flip-flop 24, which is connected to the gate of the FET Q4 through a driver 28, turns on the FET. As described above, current then flows through the FET Q4 and builds up a voltage across R7.

The voltage drop across the resistor R7 is supplied as one input to a voltage comparator 27, whose other input is a reference voltage $V_{T2}$. When the R7 voltage reaches the reference voltage value $V_{T2}$, the comparator output goes high and resets the S-R flip-flop 24. This reset pulse shuts off the FET Q4, which initiates the energy transfer from the primary winding $L_P$ to the secondary winding $L_S$ of the transformer T1. This cycle repeats for each of n pulses from the clock 25. At the end of n pulses, the output of the divide-by-n counter 25 goes high, which resets the S-R flip-flop 23. This inhibits the clock 26, which turns off the FET Q4 and completes the transfer of energy through the series of n pulses.

While the invention has been described above with particular reference to the use of a fly-back power transfer system, it will be understood that other types of transfer systems may be used.

I claim:

1. A power supply system comprising
   an a-c. power source,
   an off-line power supply for storing energy from said a-c. power source during first selected time intervals and converting at least a portion of the stored energy to a d-c. output during second selected time intervals, and
   means for disconnecting said off-line power supply from said a-c. power source during said second selected time intervals, at least said first selected time intervals being synchronized with said a-c. power source to ensure disconnection of said off-line power supply from said a-c. power source during said second selected time intervals during normal operation of said power supply system.

2. The power supply system of claim 1 wherein said first and second selected time intervals are synchronized with said a-c. power source.

3. The power supply system of claim 1 wherein said first selected time intervals are at least portions of the positive half cycles of the input signal from said a-c. power source.

4. The power supply system of claim 1 wherein said second selected time intervals occur within the negative half cycles of the input signal from said a-c. power source.

5. The power supply system of claim 1 wherein said off-line power supply includes means for converting a substantially constant amount of said stored energy to said d-c. output in each of said second selected time intervals.

6. The power supply system of claim 1 wherein said off-line power supply includes a capacitor for storing said energy from said a-c. power source during said first selected time periods, and controllable switching means connected to said capacitor for controlling said second selected time intervals.

7. The power supply system of claim 6 wherein said controllable switching means is synchronized with the a-c. input signal from said a-c. power source.

8. The power supply system of claim 6 which includes control means for turning said switching means off during said first selected time intervals, and after the discharge of a selected amount of energy from said capacitor in each of said second selected time intervals.

9. The power supply system of claim 1 which includes means for converting at least a portion of the stored energy to said d-c. output in multiple second selected time intervals between each successive pair of said second selected time intervals.

10. The power supply system of claim 1 which includes means for storing said energy from said a-c. power source when the a-c. input signal from said source is above a predetermined threshold voltage, and means for converting stored energy to said d-c. output when said a-c. input signal is below said threshold voltage.

11. The power supply system of claim 1 wherein said off-line power supply includes a half-wave rectifier receiving the a-c. signal from said power source, and a storage capacitor receiving the output from said rectifier.

12. The power supply system of claim 1 wherein said off-line power supply includes means for maintaining a substantially constant transfer of said stored energy to said d-c. output during said second selected time intervals.

13. The power supply system of claim 1 wherein said off-line power supply includes a transformer for receiving said stored energy, and switching means for forming a path for transferring said stored energy to said transformer during said second selected time intervals.

14. The power supply system of claim 13 which includes means for forming a path for transferring said stored energy to said transformer during multiple time segments in each of said second selected time intervals.

15. A power supply system comprising
an a-c. power source,
an off-line power supply for storing energy from said a-c. power source during first selected time intervals and converting at least a portion of the stored energy to a d-c. output during second selected time intervals, at least said first selected time intervals being synchronized with said a-c. power source to ensure disconnection of said off-line power supply from said a-c. power source during said second selected time intervals during normal operation of said power supply system.

16. The power supply system of claim 15 wherein said first and second selected time intervals are synchronized with said a-c. power source.

17. The power supply system of claim 15 wherein said first selected time intervals are at least portions of the positive half cycles of the input signal from said a-c. power source.

18. The power supply system of claim 15 wherein said second selected time intervals occur within the negative half cycles of the input signal from said a-c. power source.

19. The power supply system of claim 15 wherein said off-line power supply includes means for converting a substantially constant amount of said stored energy to said d-c. output in each of said second selected time intervals.

20. The power supply system of claim 15 wherein said off-line power supply includes a capacitor for storing said energy from said a-c. power source during said first selected time periods, and controllable switching means connected to said capacitor for controlling said second selected time intervals.

21. The power supply system of claim 20 wherein said controllable switching means is synchronized with the a-c. input signal from said a-c. power source.

22. The power supply system of claim 20 which includes control means for turning said switching means off during said first selected time intervals, and after the discharge of a selected amount of energy from said capacitor in each of said second selected time intervals.

23. The power supply system of claim 15 which includes means for converting at least a portion of the stored energy to said d-c. output in multiple second selected time intervals between each successive pair of said second selected time intervals.

24. The power supply system of claim 15 which includes means for storing said energy from said a-c. power source when the a-c. input signal from said source is above a predetermined threshold voltage, and means for converting stored energy to said d-c. output when said a-c. input signal is below said threshold voltage.

25. The power supply system of claim 15 wherein said off-line power supply includes a half-wave rectifier receiving the a-c. signal from said power source, and a storage capacitor receiving the output from said rectifier.

26. The power supply system of claim 15 wherein said off-line power supply includes means for maintaining a substantially constant transfer of said stored energy to said d-c. output during said second selected time intervals.

27. The power supply system of claim 15 wherein said off-line power supply includes a transformer for receiving said stored energy, and switching means for forming a path for transferring said stored energy to said transformer during said second selected time intervals.

28. The power supply system of claim 27 which includes means for forming a path for transferring said stored energy to said transformer during multiple time segments in each of said second selected time intervals.

29. A method of converting power from an a-c. power source to d-c. power, comprising the steps of:

storing energy from an a-c. power source in an off-line power supply during first selected time intervals, converting at least a portion of the stored energy to a d-c. output during second selected time intervals, disconnecting said off-line power supply from said a-c. power source during said second selected time intervals to reduce conducted EMI and synchronizing said first selected time intervals with said a-c. power source to ensure disconnection of said off-line power supply from said a-c. power source during said second selected time intervals during normal operation of said a-c. power source.

\* \* \* \* \*